United States Patent
Lin et al.

(10) Patent No.: US 11,609,836 B2
(45) Date of Patent: Mar. 21, 2023

(54) OPERATION METHOD AND OPERATION DEVICE OF FAILURE DETECTION AND CLASSIFICATION MODEL

(71) Applicant: UNITED MICROELECTRONICS CORP., Hsinchu (TW)

(72) Inventors: Ching-Pei Lin, Hsinchu County (TW); Ji-Fu Kung, Taichung (TW); Te-Hsuan Chen, Tainan (TW); Yi-Lin Hung, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 283 days.

(21) Appl. No.: 17/180,897

(22) Filed: Feb. 22, 2021

(65) Prior Publication Data
US 2022/0222162 A1  Jul. 14, 2022

(30) Foreign Application Priority Data
Jan. 12, 2021  (CN) .......................... 202110035020.2

(51) Int. Cl.
| | | |
|---|---|---|
| G06F 11/00 | (2006.01) | |
| G06F 11/32 | (2006.01) | |
| G06F 11/30 | (2006.01) | |
| G06F 11/34 | (2006.01) | |
| G06F 18/214 | (2023.01) | |
| G05B 23/02 | (2006.01) | |

(52) U.S. Cl.
CPC .......... *G06F 11/322* (2013.01); *G05B 23/024* (2013.01); *G06F 11/3075* (2013.01); *G06F 11/348* (2013.01); *G06F 18/214* (2023.01); *G05B 2219/24085* (2013.01)

(58) Field of Classification Search
CPC .... G06F 11/30; G06F 11/3072; G06F 11/323; G06F 11/3636; G06F 11/322; G06F 11/3075; G06F 11/348
See application file for complete search history.

(56) References Cited

U.S. PATENT DOCUMENTS

| | | | |
|---|---|---|---|
| 7,092,922 B2 | 8/2006 | Meng et al. | |
| 7,477,960 B2* | 1/2009 | Willis | G05B 19/4184 700/121 |
| 7,533,006 B2 | 5/2009 | Huddleston et al. | |
| 8,301,576 B2 | 10/2012 | Meng et al. | |
| 2020/0249651 A1* | 8/2020 | Lee | G05B 23/0221 |
| 2021/0042570 A1* | 2/2021 | Iskandar | G05B 23/0294 |
| 2022/0027230 A1* | 1/2022 | Burch | G06F 11/0751 |

* cited by examiner

*Primary Examiner* — Charles Ehne
(74) *Attorney, Agent, or Firm* — WPAT, PC

(57) ABSTRACT

An operation method and an operation device of a failure detection and classification (FDC) model are provided. The operation method of the FDC model includes the following steps. A plurality of raw traces are continuously obtained. If the raw traces have started to be changed from the first waveform to the second waveform, whether at least N pieces in the race traces have been changed to the second waveform is determined. If at least N pieces in the raw traces have been changed to the second waveform, the raw traces which have been changed to the second waveform are automatically segmented to obtain several windows. An algorithm is automatically set for each of the windows. Through each of the algorithms, an indicator of each of the windows is obtained. The FDC model is retrained based on these indicators.

16 Claims, 6 Drawing Sheets

OPERATION METHOD AND OPERATION DEVICE OF FAILURE DETECTION AND CLASSIFICATION MODEL

This application claims the benefit of People's Republic of China application Serial No. 202110035020.2, filed Jan. 12, 2021, the disclosure of which is incorporated by reference herein in its entirety.

TECHNICAL FIELD

The disclosure relates in general to an operation method and an operation device, and more particularly to an operation method and an operation device of a failure detection and classification (FDC) model.

BACKGROUND

With the rapid development of semiconductor technology, the complexity and precision of the manufacturing process continue to increase. In the semiconductor manufacturing process, after various detection information of the process apparatus is analyzed, an analysis model can be used for Prognostic and Health Management (PHM) or Virtual Metrology (VM). If it is found that the forecast information or measurement information of the process equipment is not ideal, it needs to be adjusted as soon as possible to avoid a large number of defective products.

Traditionally, manpower is used to monitor whether the analysis model needs to be adjusted or added to a new data set for retraining. However, this method must consume considerable manpower. Moreover, with the increase in product complexity and process precision, there are more and more cases in which the analysis model needs to be adjusted or further retrained. If the analysis model cannot be corrected in real time, the process cannot be accurately monitored.

SUMMARY

The disclosure is directed to an operation method and an operation device of a failure detection and classification (FDC) model. In the case where the FDC model is found to be insufficiently trained, the FDC model can be retrained, and if the forecast result of the FDC model is found to be offset, the FDC model can be adjusted.

According to one embodiment, an operation method of a failure detection and classification (FDC) model is provided. The operation method of the FDC model includes the following steps. A plurality of raw traces are continuously obtained. Whether the raw traces have started to be changed from a first waveform to a second waveform is determined. If the raw traces have started to be changed from the first waveform to the second waveform, whether at least N pieces in the race traces have been changed to the second waveform is determined. If at least N pieces in the raw traces have been changed to the second waveform, the raw traces which have been changed to the second waveform are automatically segmented to obtain a plurality of windows. An algorithm is automatically set for each of the windows. An indicator of each of the windows is obtained through each of the algorithms. The FDC model is retrained based on the indicators.

According to another embodiment, an operation device of a failure detection and classification (FDC) model is provided. The operation device of the FDC model includes a data acquisition unit, a management unit, a window cutting unit, an indicator calculation unit, the FDC model and a training unit. The data acquisition unit is configured to continuously obtain a plurality of raw traces. The management unit is configured to determine whether the raw traces have started to be changed from a first waveform to a second waveform and determine whether at least N pieces in the race traces have been changed to the second waveform. The window cutting unit is configured to automatically segment the raw traces which have been changed to the second waveform to obtain a plurality of windows, if at least N pieces in the raw traces have been changed to the second waveform. The management unit further automatically sets an algorithm for each of the windows. The indicator calculation unit is configured to obtain an indicator of each of the windows through each of the algorithms. The training unit is configured to retrain the FDC model based on the indicators.

Figure 1:
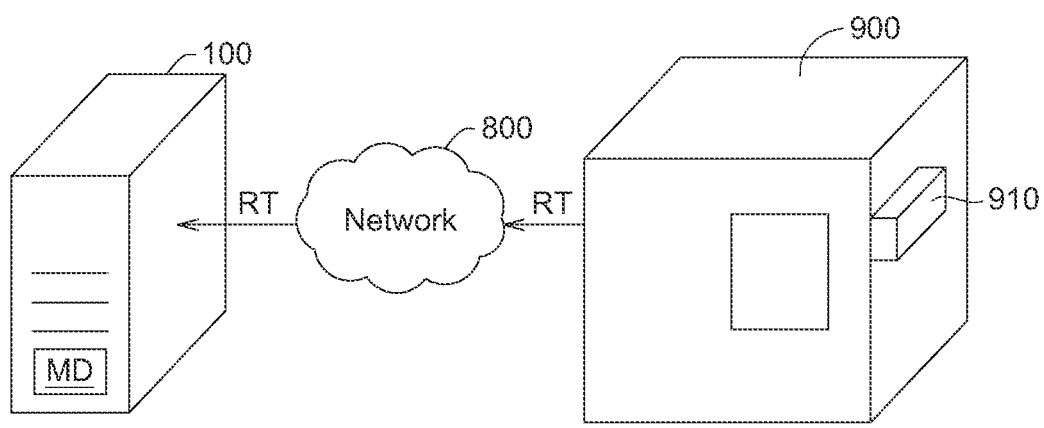
FIG. 1 shows a schematic diagram of the process monitoring according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a schematic diagram of the process monitoring according to an embodiment. In the semiconductor manufacturing process, a variety of semiconductor apparatus 900 is used to perform various procedures on the wafer, such as deposition, etching, annealing, etc. The semiconductor apparatus 900 is equipped with sensors 910 to sense pressure, temperature, concentration and other values. The sensors 910 usually perform continuous sensing to obtain raw traces RT. The raw traces RT can be transmitted to the remote operation device 100 via network 800. The operation device 100 is, for example, a computer, a server, a cluster computing center or an edge computing center. The operation device 100 can input the raw traces RT to the FDC model MD to output a forecast result RS. The forecast result RS is, for example, the yield forecast of the manufacturing process for Prognostics and Health Management (PHM). Or, the forecast result RS is, for example, the inferred thickness or inferred line width of other wafers to achieve the purpose of Virtual Metrology (VM).

With the increase in product complexity and process precision, the FDC model MD needs to be adjusted or further retrained more and more. If the FDC model MD cannot be corrected in real time, it will not be possible to accurately monitor and control the process.

Figure 2:
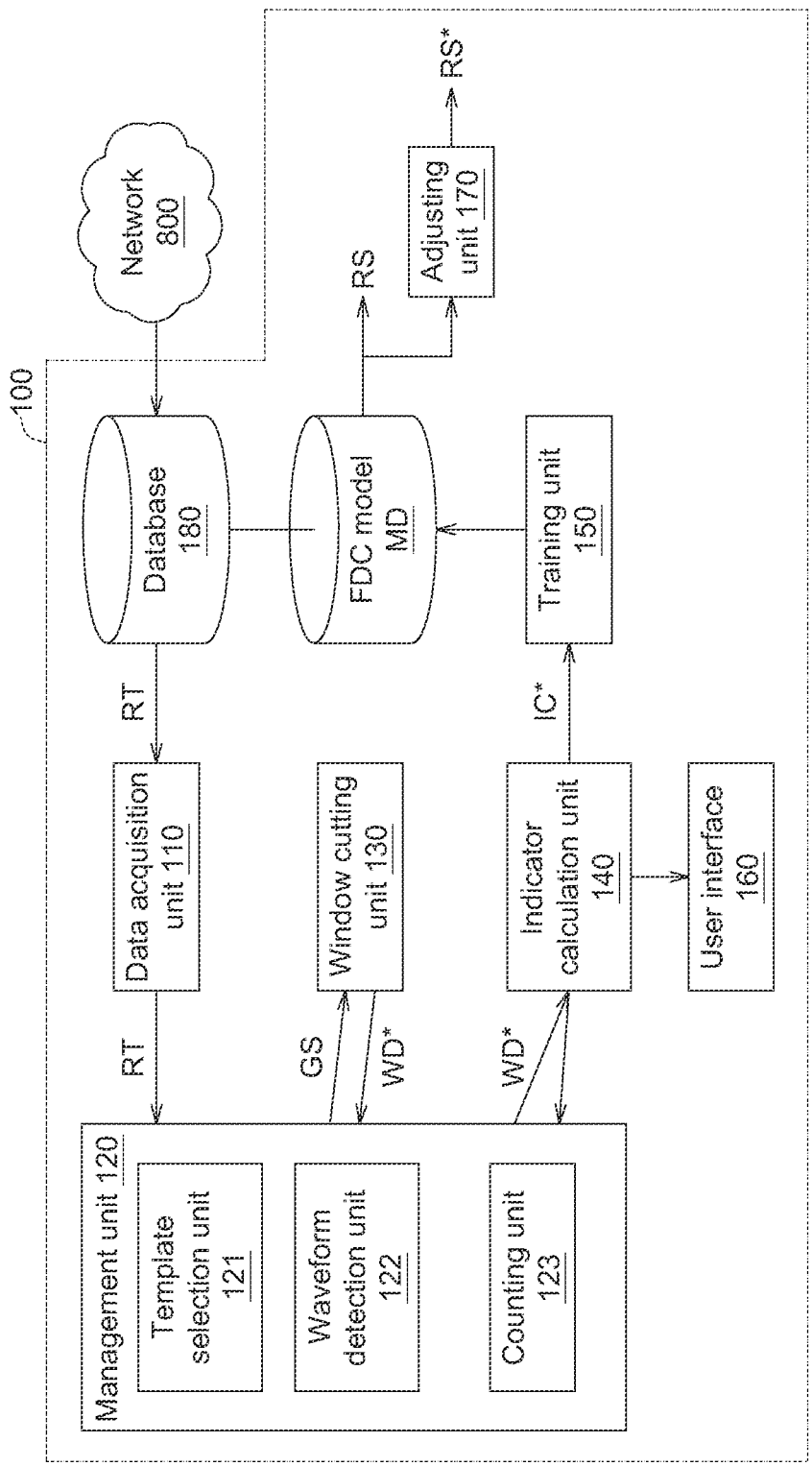
FIG. 2 shows a block diagram of an operation device of a failure detection and classification (FDC) model according to an embodiment.

Please refer to FIG. 2, which shows a block diagram of the operation device 100 of the FDC model MD according to an embodiment. In addition to performing functions such as the prediction and health management (PHM) and the virtual measurement (VM) through the FDC model MD, the operation device 100 can also retrain and adjust the FDC model MD adaptively.

In addition to the FDC model MD, the operation device 100 further includes a data acquisition unit 110, a management unit 120, a window cutting unit 130, an indicator calculation unit 140, a training unit 150, a user interface 160, an adjusting unit 170 and a database 180. The data acquisition unit 110, the management unit 120, the window cutting unit 130, the indicator calculation unit 140, the training unit 150, the adjusting unit 170 and/or the FDC model MD are, for example, a circuit, a chip, a circuit board, program codes or a storage device storing the program codes. The user interface 160 is, for example, a display screen, a touch screen, or an operation screen. The database 180 is, for example, a hard disk, a memory or a cloud data center. The management unit 120 includes a template selection unit 121, a waveform detection unit 122, and a counting unit 123. The template selection unit 121, the waveform detection unit 122 and the counting unit 123 are, for example, a circuit, a chip, a circuit board, program codes or a storage device for storing the program codes.

After the operation device 100 obtains the raw traces RT through the data acquisition unit 110, if the FDC model MD is found to be insufficiently trained, the FDC model MD can be retrained through the operation of the management unit 120, the window cutting unit 130, the indicator calculation unit 140 and the training unit 150. In addition, after the operation device 100 obtains the raw traces RT through the data acquisition unit 110, if the forecast result RS of the FDC model MD is offset, the FDC model MD can be adjusted through the operation of the adjusting unit 170.

Figure 3:
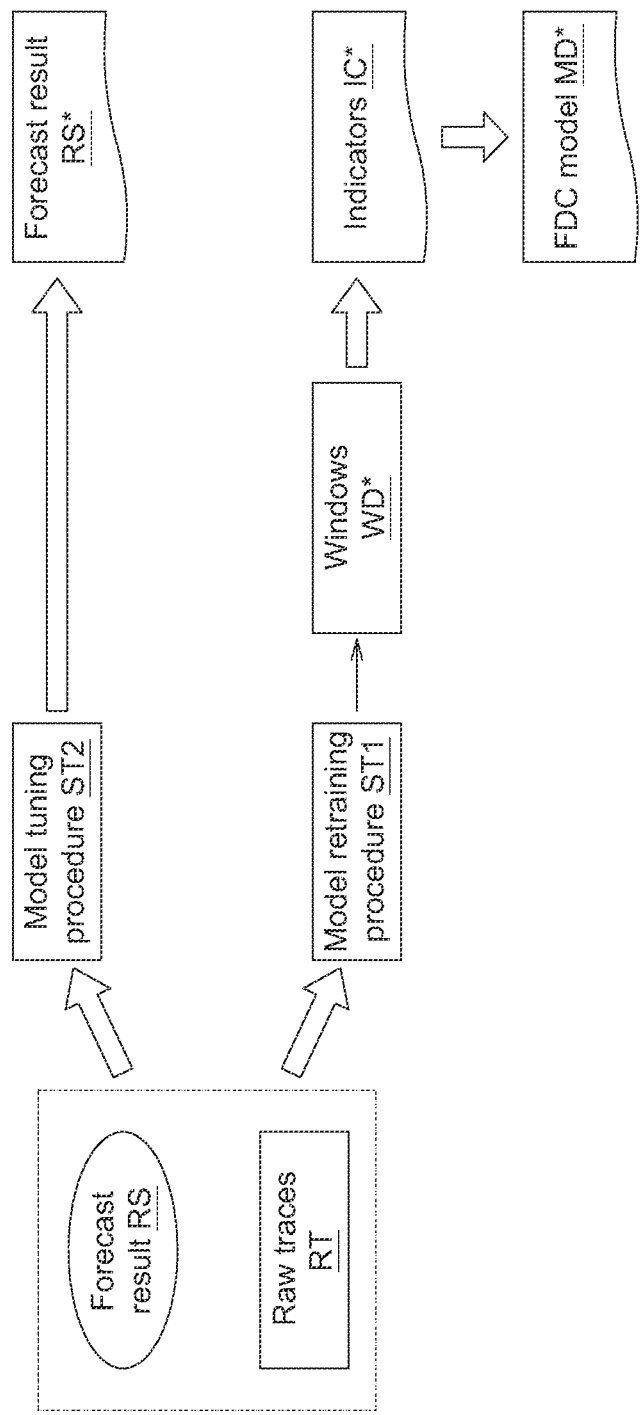
FIG. 3 shows a model retraining procedure and a model tuning procedure according to an embodiment.
Figure 4:
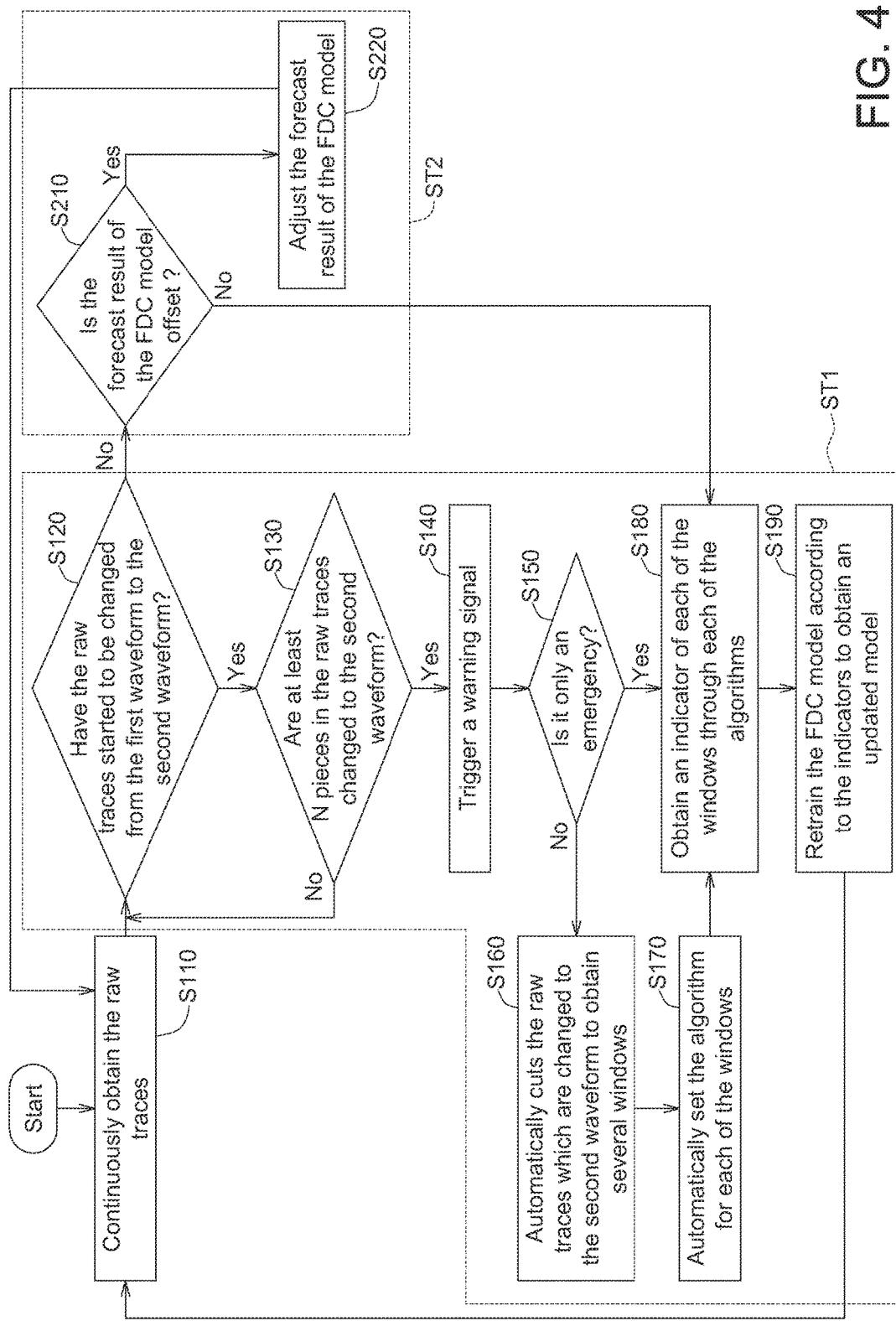
FIG. 4 shows a flow chart of the operation method of the FDC model.

Please refer to FIGS. 3 to 4. FIG. 3 shows a model retraining procedure ST1 and a model tuning procedure ST2 according to an embodiment. FIG. 4 shows a flow chart of the operation method of the FDC model. The model retraining procedure ST1 includes steps S120 to S190, and the model tuning procedure ST2 includes steps S210 to S220. In the step S110, the data acquisition unit 110 continuously obtains the raw traces RT. These raw traces RT are the values detected by the same sensor. Under the same manufacturing process, the same apparatus and the same parameter settings, the waveforms of these raw traces RT should be similar.

Next, in the step S120, the waveform detection unit 122 of the management unit 120 determines whether the raw traces RT have started to be changed from the first waveform to the second waveform. If the raw trace RT have started to be changed from the first waveform to the second waveform, the process proceeds to the step S130; if the raw traces RT are maintained in the first waveform, the process proceeds to the step S210. Once it is found that the waveforms of the raw traces RT have changed, the process, the apparatus or the parameter settings may be changed, and the model retraining procedure ST1 is needed to be performed.

Figure 5:
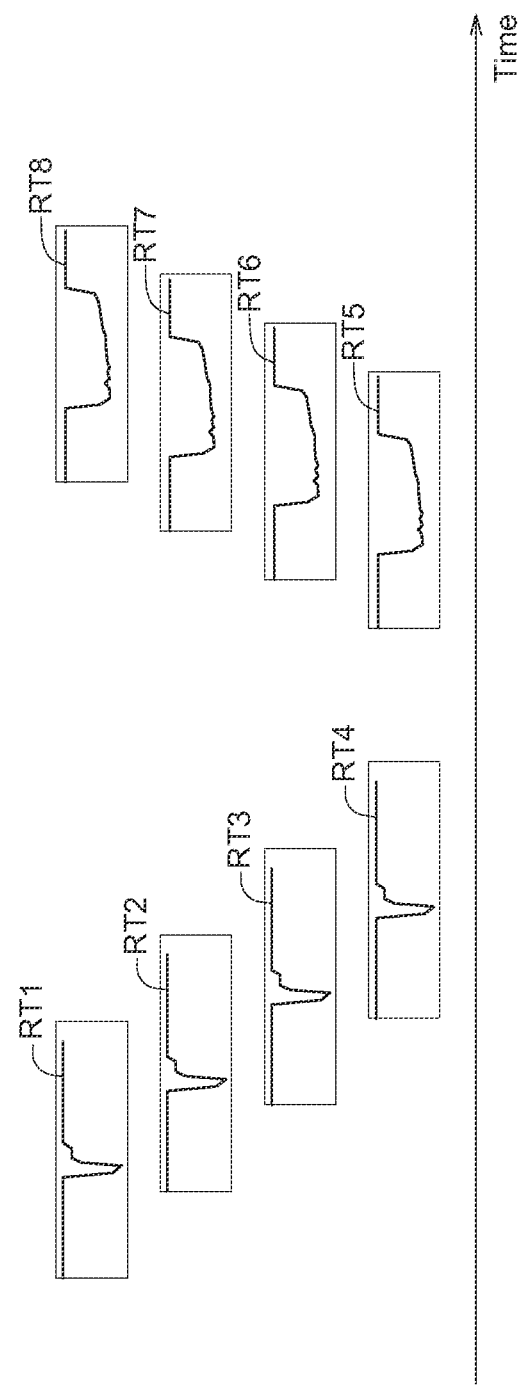
FIG. 5 illustrates the change of the raw traces.

Then, in step S130, the counting unit 123 of the management unit 120 determines whether at least N pieces in the raw traces RT have been changed to the second waveform. N is, for example, 4 or 5. If at least N pieces in the raw traces RT have been changed to the second waveform, the process proceeds to the step S140; if there are not N pieces in the raw traces RT that have been changed to the second waveform, the process proceeds to the step S120. For example, please refer to FIG. 5, which illustrates the change of the raw traces RT1 to RT8. The raw traces RT1 to RT4 have the first waveform. As time changes, the raw trace RT5 has been changed to the second waveform. When only one raw trace (the raw trace RT5) is accumulated and has been changed to the second waveform, the process will return to the step S120 to continue to determine whether the next raw trace RT6 has been also changed to the second waveform. Until 4 raw traces (the raw traces RT5 to RT8) are the accumulated and have been changed to the second waveform (taking N=4 as an example), the process proceeds to the step S140. Through the step S130, it can be confirmed that the raw traces RT5 to RT8 does have a continuous change, and it will indeed affect the subsequent analysis.

Then, in the step S140, the management unit 120 triggers a warning signal to notify the operator.

Then, in the step S150, the management unit 120 or the operator determines whether it is only an emergency. If it is only the emergency event, the process proceeds to the step S180; if it is not the emergency event, the process proceeds to the step S160. The emergency event is, for example, the abnormal power failure of the apparatus, the abnormal pressure leakage, the voltage instability, etc. Such emergency events will not occur continuously, so through this step, emergency events can be ruled out without continuing to perform the model retraining procedure ST1.

In the step S160, the window cutting unit 130 automatically cuts the raw traces RT which have been changed to the second waveform to obtain several windows WD*. In this step, the template selection unit 121 of the management unit 120 will pick up one of the raw traces RT which have been changed to the second waveform as a golden sample GS. After the golden sample GS is picked up, it will be handed over to the window cutting unit 130, so that the window cutting unit 130 will cut the golden sample GS according to the trace types thereof. The trace types include a constant trajectory, a fluctuating trajectory, a zero point trajectory, a process processing trajectory, an ascending trajectory, a descent trajectory, a local peak trajectory and a local valley trajectory. Different trace types will be cut into different windows WD*.

Figure 6:
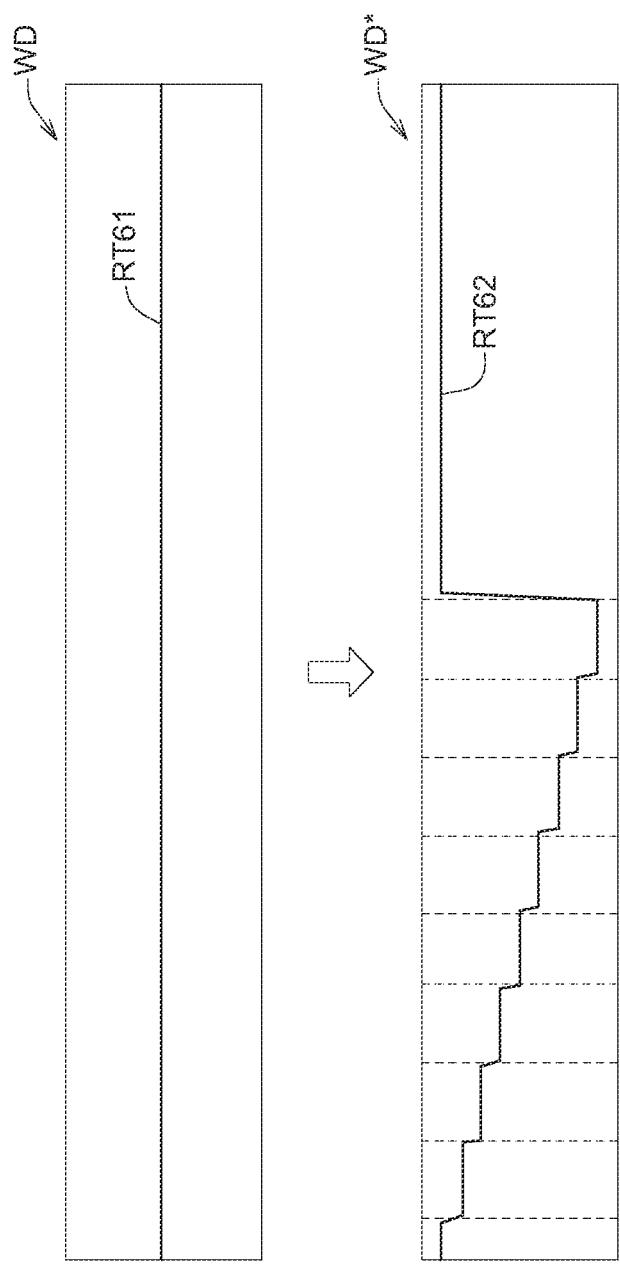
FIG. 6 shows a raw trace with the first waveform and a raw trace with the second waveform according to an embodiment.

Please refer to FIG. 6, which shows a raw trace RT61 with the first waveform and a raw trace RT62 with the second waveform according to an embodiment. The raw trace RT61 with the first waveform is cut out of the window WD. The raw trace RT61 with the second waveform will be cut out of windows WD*.

Then, in step S170, the indicator calculation unit 140 automatically sets the algorithm for each of the windows WD*. The management unit 120 can set different algorithms according to different trace types, such as calculating the average, calculating the slope, calculating the standard deviation, calculating the peak value, calculating the wave number, etc.

Next, in the step S180, the indicator calculation unit 140 obtains an indicator IC* of each of the windows WD* through each of the algorithms.

Then, in the step S190, the training unit 150 retrains the FDC model MD according to the indicators IC* to obtain an updated FDC model MD* (shown in FIG. 3).

The model retraining procedure ST1 is completed through the above steps S120 to S190. As shown in FIG. 3, when the FDC model MD is found to be insufficiently trained, the new windows WD* can be automatically cut out, and the indicators IC* can be calculated based on these windows WD*. Next, the indicators IC* will be used for retraining the FDC model MD to obtain the updated FDC model MD*.

The model tuning procedure ST2 includes steps S210 to S220. In the step S210, it has been confirmed that the raw traces RT are maintained in the first waveform, and the adjusting unit 170 determines whether the forecast result RS of the FDC model MD is offset. If the forecast result RS of the FDC model MD is offset, the process proceeds to the step S220; if the forecast result RS of the FDC model MD is not offset, the process proceeds to step S180. In this step, the forecast result RS, such as predicted line width and predicted thickness, can be confirmed through the Scanning Electron Microscope (SEM) image.

Next, in the step S220, the adjusting unit 170 adjusts the forecast result RS of the FDC model MD to the forecast result RS*. In this step, the adjusting unit 170 shifts the forecast result RS to obtain the forecast result RS*. In this way, if the forecast result RS of the FDC model MD is offset, the forecast result RS can be adjusted without updating the FDC model MD to obtain the accurate forecast result RS*.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operation method of a failure detection and classification (FDC) model, comprising:
    continuously obtaining a plurality of raw traces;
    determining whether the raw traces have started to be changed from a first waveform to a second waveform;
    determining whether at least N pieces in the race traces have been changed to the second waveform, if the raw traces have started to be changed from the first waveform to the second waveform;
    automatically segmenting the raw traces which have been changed to the second waveform to obtain a plurality of windows, if at least N pieces in the raw traces have been changed to the second waveform;
    automatically setting an algorithm for each of the windows;
    obtaining an indicator of each of the windows through each of the algorithms; and
    retraining the FDC model based on the indicators.

2. The operation method of the FDC model according to claim 1, further comprising:
    triggering a warning signal, if at least N pieces in the raw traces have been changed to the second waveform.

3. The operation method of the FDC model according to claim 1, further comprising:
    picking up one of the raw traces which have been changed to the second waveform as being a golden sample.

4. The operation method of the FDC model according to claim 1, wherein the indicators are shown on a user interface.

5. The operation method of the FDC model according to claim 1, further comprising:
    determining whether a forecast result of the FDC model is offset and the raw traces are maintained in the first waveform; and
    adjusting the forecast result of the FDC model, if the forecast result of the FDC model is offset and the raw traces are maintained in the first waveform.

6. The operation method of the FDC model according to claim 5, wherein in the step of adjusting the forecast result of the FDC model, the forecast result is shifted.

7. The operation method of the FDC model according to claim 1, wherein the windows have a plurality of trace types which are different.

8. The operation method of the FDC model according to claim 7, wherein the trace types a constant trajectory, a fluctuating trajectory, a zero point trajectory, a process processing trajectory, an ascending trajectory, a descent trajectory, a local peak trajectory and a local valley trajectory.

9. An operation device of a failure detection and classification (FDC) model, comprising:
    a data acquisition unit, configured to continuously obtain a plurality of raw traces;
    a management unit, configured to determine whether the raw traces have started to be changed from a first waveform to a second waveform and determine whether at least N pieces in the race traces have been changed to the second waveform;
    a window cutting unit, configured to automatically segment the raw traces which have been changed to the second waveform to obtain a plurality of windows, if at least N pieces in the raw traces have been changed to the second waveform, wherein the management unit further automatically sets an algorithm for each of the windows;
    an indicator calculation unit, configured to obtain an indicator of each of the windows through each of the algorithms;
    the FDC model; and
    a training unit, configured to retrain the FDC model based on the indicators.

10. The operation device of the FDC model according to claim 9, wherein if at least N pieces in the raw traces have been changed to the second waveform, the management unit triggers a warning signal.

11. The operation device of the FDC model according to claim 9, wherein the management unit further picks up one of the raw traces which have been changed to the second waveform as being a golden sample.

12. The operation device of the FDC model according to claim 9, further comprising:
    a user interface, configured to show the indicators.

13. The operation device of the FDC model according to claim 9, further comprising:
    an adjusting unit, configured to determining whether a forecast result of the FDC model is offset and the raw traces are maintained in the first waveform, wherein if the forecast result of the FDC model is offset and the raw traces are maintained in the first waveform, the adjusting unit adjusts the forecast result of the FDC model.

14. The operation device of the FDC model according to claim 13, wherein the adjusting unit shifts the forecast result.

15. The operation device of the FDC model according to claim 9, wherein the windows have a plurality of trace types which are different.

16. The operation device of the FDC model according to claim 15, wherein the trace types a constant trajectory, a fluctuating trajectory, a zero point trajectory, a process processing trajectory, an ascending trajectory, a descent trajectory, a local peak trajectory and a local valley trajectory.

* * * * *